Aug. 24, 1943.　　　R. A. MILLER　　　2,327,918
HEAT REJECTING GLASS
Filed Jan. 23, 1941

Inventor
ROBERT A. MILLER
By Olew E. Bee
Attorney

Patented Aug. 24, 1943

2,327,918

UNITED STATES PATENT OFFICE 2,327,918

HEAT REJECTING GLASS

Robert A. Miller, Tarentum, Pa., assignor to Pittsburgh Plate Glass Company, Allegheny County, Pa., a corporation of Pennsylvania Application January 23, 1941, Serial No. 375,583

4 Claims. (Cl. 88—60)

The present invention relates to glazing panels and more particularly to glass which will form a barrier against solar-heat radiation.

One object of the invention is to provide a glass, suitable for glazing purposes, which will admit light, permit reasonably clear vision and yet will restrict the passage therethrough of a major portion of the total solar heat radiations.

Other objects and advantages of the invention will become more apparent from the following detailed description of a preferred embodiment thereof.

The advent of air conditioning has rendered more serious the problem of restricting heat transfer through windows and other glazed portions of buildings. Through the use of multiple-glazed units it has been possible to reduce to a minimum the outward heat flow from air-conditioned rooms during winter months. Special heat absorbing glasses, which contain relatively large amounts of iron oxide, are valuble to reduce the amount of infra-red radiations passing through the glass into the building during summer months.

The ordinary heat absorbing glass has a pronounced greenish coloration and this acts as a filter for the visible light rays, thus restricting the admission of light and curtailing clear vision through the glass. Obviously, therefore, the disadvantages incident to the use of a heat absorbing glass will more than offset the advantages to be gained by the use thereof. There is, however, a well defined need for a glass which will restrict a major portion of solar heat radiations while effecting only slightly the ordinary characteristics of glass.

Briefly stated, the present invention contemplates a heat-rejecting glass comprising a glass panel which contains a plurality of spaced reflecting areas, to reject a major portion of direct sunlight, but to permit passage of reflected light and to permit reasonable vision therethrough.

Figure 1:
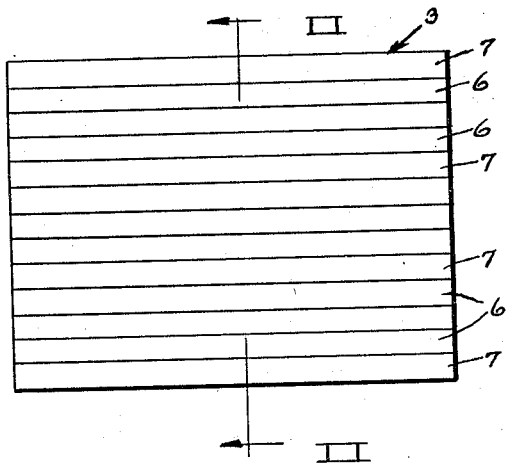
Figure 2:
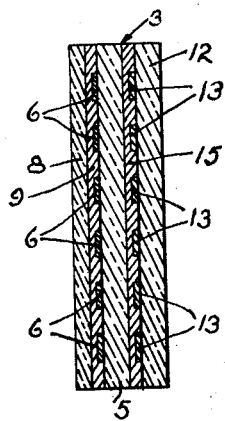

In the drawing Fig. 1 is a front elevational view of a glass panel embodying the principles of my invention and Fig. 2 is a vertical sectional view thereof taken substantially along the line II—II of Fig. 1.

Referring to the drawing, a panel 3 comprises a plate 5 of glass having formed thereon horizontal bands or strips 6 of a reflecting material arranged in spaced relation over the surface of the plate. A plate 8 of glass covers the treated surface of the plate 5 and is united thereto by an interposed layer 9 of a plastic material such as a polyvinyl acetal resin. A third plate 12 of glass having formed on one surface horizontal bands 13 of a reflecting material arranged in spaced relation over the surface is united to the exposed surface of the plate 5 with the coated surface adjacent thereto by means of an interposed layer 15 of plastic material. The several elements of the panel 3 are bonded into a composite unit by the application of heat and pressure, in accordance with the normal procedure followed in the laminated glass art. The exact conditions of heat and pressure will be dependent upon the nature of the plastic material employed. Where polyvinyl butyral resin forms the layers 9 and 15 the laminating operation can be completed at a temperature of approximately 225° F. and a pressure of approximately 100 pounds per square inch.

The bands 6 and 13 may be any one or combination of the materials ordinarily used in the production of mirrors. Silver, gold, aluminum, zinc and the like are satisfactory for the intended purposes. Any of the well known methods of application of these reflecting surfaces may be employed. The reflecting bands may vary in width from approximately ⅛ of an inch to ½ an inch. The clear spaces between the bands may also vary as desired. Obviously, where a larger percentage of the total area of the glass surface has a reflecting coating there will be a reduction in the amount of light which will pass through the panel. Also, where the clear areas are of minimum width, visibility through the panel will be curtailed.

The thickness of the reflecting bands 6 and 13 may be varied as desired. Since these bands are not exposed, it is possible for them to consist of light films of reflecting metal affording a degree of transparency similar to that present in the so-called transparent mirrors. Whether the reflecting film is light or heavy, it will be equally satisfactory in rejecting direct rays of the sun. It is desirable, however, that the second series of reflecting bands be of the same dimensions as the first series and have an identical special arrangement, in order that the clear and coated areas of the plates 5 and 12 are in register. This provision ensures proper relationship of the coated and uncoated areas of the panel.

The construction of the panel is such that its manner of function is substantially self-explanatory. Angular rays of light striking the plate 8 and passing therethrough will be reflected to a large extent by the bands 6. Those rays of light which pass between the bands through the uncoated areas of the plate 5 will be arrested and reflected by the bands 13. As the light rays more nearly approach a vertical to the plane of the panel 3 a larger portion of the rays will pass through the uncoated areas of the plates 5 and 12, which are in register. Ordinarily the rays of the sun at this point are greatly absorbed by particles of dust, etc. contained in the atmosphere and are relatively cool. Of course, the total amount of rays passing through the panel as the angle of incidence is increased toward the vertical may be reduced by diminishing the width of the clear areas. Reflected and diffused light will not be stopped by the panel 3 and visibility is possible through the uncoated areas.

It will at once be obvious that various modifications in the nature of the several elements and their arrangements are possible without departing from the spirit of the invention or the scope of the appended claims.

What I claim is:

1. A heat rejecting glazing unit comprising a panel formed of a glass plate, horizontal bands of reflecting material arranged on one surface of the glass plate in spaced relation, a second plate of glass covering the banded surface of the first glass plate, a third plate of glass, having horizontal bands of reflecting material arranged on one surface thereof in spaced relation, said third plate covering the unbanded surface of the first glass plate, the horizontal bands of each plate being laterally in register, and interposed layers of plastic material uniting the glass plates.

2. A heat rejecting glazing unit comprising a panel formed of a glass plate, horizontal bands of silver deposited on one surface of the glass plate in spaced relation, a second plate of glass covering the partially silvered surface of the first glass plate, a third glass plate having horizontal bands of silver deposited on one surface thereof in spaced relation conforming to that of the bands on the first plate of glass, said third plate covering the unsilvered surface of the first glass plate with the partially silvered surface of the third glass plate adjacent the unsilvered surface of the first glass plate and with the horizontal silver bands of each plate in register, and interposed layers of plastic material uniting the several glass plates.

3. In a laminated glazing unit adapted to be disposed as a panel in a vertical wall, a plurality of glass plates having resinous interlayer material holding the plates in laminated relation, a group of parallel bands of reflecting material on one side of the glass plate surfaces, and a second group of parallel bands of reflecting material on another of the plate glass surfaces, the bands of one surface corresponding substantially to the bands of the other surface, and having at least one thickness of glass plate separating said groups.

4. A heat rejecting glazing unit comprising an upright glass plate, transparent plastic interlayers in sheet form adhered upon opposite sides of the plate, spaced bands of reflecting material at least partially embedded in the plastic interlayers on opposite sides of the plate and arranged horizontally with each band on one side of the plate registering horizontally with a companion band on the other side of the plate, and a glass plate adhered to the outer side of each interlayer.

ROBERT A. MILLER.